Jan. 20, 1959  R. E. DOBRATZ  2,869,280
DISPOSABLE TRAP
Filed Aug. 7, 1957

INVENTOR.
Robert E. Dobratz
BY Robert F. Casey

United States Patent Office 2,869,280
Patented Jan. 20, 1959

2,869,280

DISPOSABLE TRAP

Robert E. Dobratz, Plantsville, Conn.

Application August 7, 1957, Serial No. 676,834

5 Claims. (Cl. 43—77)

My invention relates to mouse and rat traps and the like.

One object of my invention is to provide a trap which is adapted to be sold in a "set" condition and disposed of after a single use.

Another object of my invention is to provide a trap which is extremely simple and inexpensive in construction.

Additional objects and aspects of my invention will become apparent from the following detailed description, and its scope will be pointed out in the appended claims.

In accordance with my invention, I provide a trap comprising a generally rectangular enclosure having a single opening therein adapted to admit a rodent, and a generally U-shaped trapping member within the enclosure adapted to be held in a set condition by a holding member which is also adapted to serve as bait. When a rodent enters and gnaws through the holding member, the trapping member is released and traps and kills the rodent. The entire trap, containing the rodent, may then be disposed of.

My invention will be more fully understood both as to structure and function, from the following detailed description, taken in conjunction with the accompanying drawing, in which, Figure 1 is a perspective view of a trap embodying my invention, a portion of the enclosure being broken away;

Figure 1:
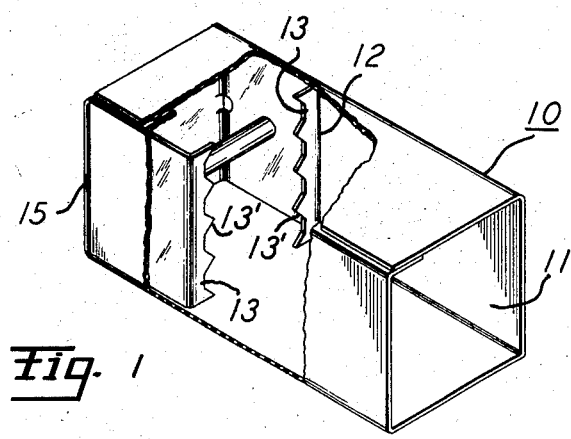

In the drawing, the invention is shown as embodied in a trap comprising a generally rectangular enclosure 10 having an open end wall 11. The enclosure 10 is formed of suitable inexpensive material, such, for instance, as cardboard.

A single, one-piece trapping member is provided comprising a generally U-shaped member 12, of suitable strong resilient material, such for instance as spring steel. The trapping member 12 has its opposed side wall portions terminating in inwardly-directed opposed jaw portions 13, having a plurality of sharp pointed projections 13'.

Figures 2, 3:
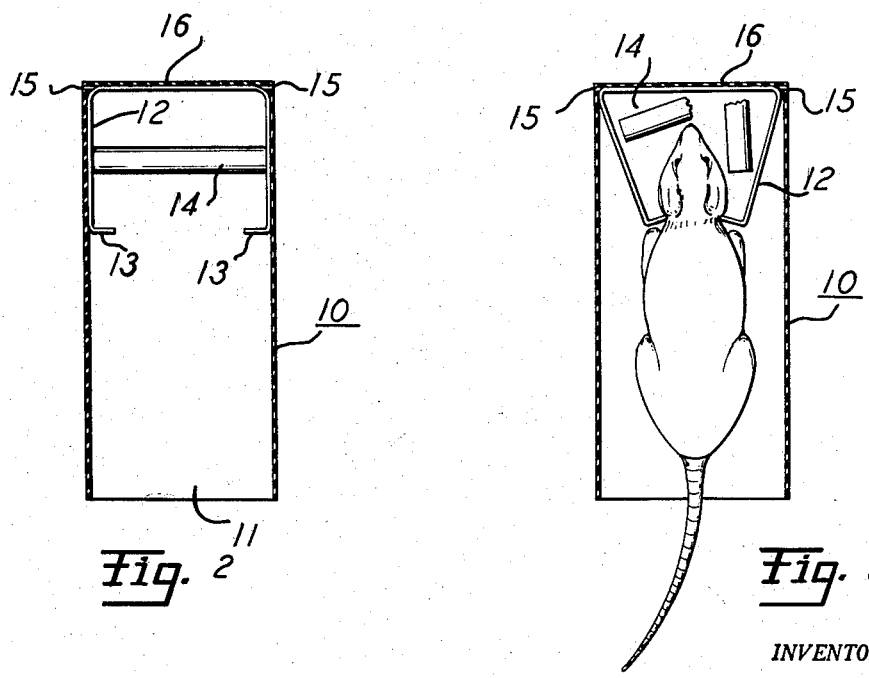
Figure 2 is a top plan view of the trap of Figure 1, the top wall being omitted, and showing the trap in a set condition.
Figure 3 is a view similar to Figure 2, showing the trap in a sprung condition, with a rodent trapped therein.

The opposed side wall portions of the member 12 are strongly biased toward each other by inherent bias of the member 12, and are adapted to be maintained in spaced-apart relation as shown in Figure 2, by a holding member 14. The holding member 14 is also adapted to serve as bait for the trap, and for this purpose comprises a relatively strong but porous material which is edible to rodents, such for instance, as balsa wood. To render the member 14 more attractive to rodents, it is preferably impregnated with edible material such, for example, as starch.

The trapping member 12 is also provided with lanced-out lugs 15 which are adapted to be caught between the end wall 16 of the enclosure 10 and the portions of the side walls adjacent thereto. The end wall 16 is also preferably firmly attached to the main enclosure 10 such as by gluing or cementing, to prevent its opening.

The trap of Figure 1 is adapted to be manufactured and sold in the set condition, as shown in Figures 1 and 2. The housewife or other purchaser is not required to insert bait, or to set the trap, but merely purchases it and places it in any desired location.

When the trap is used, a rodent, attracted by the bait 14 or by natural curiosity, enters the opening 11, and gnaws on the bait stick member 14. When the member 14 is weakened sufficiently by the rodent, the member 14 collapses suddenly, due to the force of the inwardly-biased side walls of the member 12. At the same time, the side walls snap inwardly and the jaws 13 trap and kill the rodent, as illustrated in Figure 3. Since the trapping member 12 is retained adjacent the closed end wall by the engagement of the lugs 15 between the end wall and the adjacent side walls, it is not possible for the rodent to pull the member 12 out of the enclosure if he is not at once killed by the jaws 13. This also prevents the rodent from dragging the trap away. The end wall is also glued or cemented in the closed condition, or mechanically interlocked in such position, for a similar reason.

After an animal has been trapped and killed in the trap, the trap may be picked up and disposed of without contact with the trapped rodent, and in fact, without the major portion of the rodent being exposed to view.

While I have disclosed only one embodiment of my invention, it will be apparent that many modifications thereof may be made, and I therefore intend by the appended claims to cover all such modifications as fall within the true spirit and scope of my invention.

I claim:

1. A trap for rodents comprising an enclosure having a single opening therein adapted to admit said rodents, and a one-piece generally U-shaped trapping member within said enclosure comprising two opposed portions terminating in opposed inwardly directed trapping jaws, said opposed portions being biased toward each other to urge said jaws toward each other, and a holding member adapted normally to hold said jaws in spaced apart relation against said bias, said element comprising material edible to said rodents.

2. A trap for rodents comprising an enclosure having a single opening therein adapted to admit said rodents, a one-piece generally U-shaped trapping member of flat sheet metallic material within said enclosure comprising two opposed side wall portions terminating in opposed inwardly-directed trapping jaws, said side wall portions being biased toward each other to urge said jaws toward each other, and a holding member adapted normally to hold said jaws in spaced apart relation against said bias, said element comprising material edible to said rodents.

3. A trap for rodents comprising a generally rectangular enclosure having an end wall, opposed top and bottom walls, opposed side walls and an open front wall, a generally U-shaped flat sheet metallic trapping member having opposed side wall portions terminating in inwardly-directed jaws, means attaching said member to said enclosure within the bight portion thereof adjacent said end wall, and a holding member between said opposed side wall portions comprising material edible to said rodents, said trapping member having an inherent bias urging said opposed side wall portions and said jaws toward each other.

4. A trap as set forth in claim 3, wherein said means attaching said trapping member to said enclosure comprises two opposed lugs integral with said member adjacent the bight portions thereof and extending outwardly beyond the planes of the side wall portions thereof respectively and each extending between said end wall and one of said side walls of said enclosure.

5. A trap for rodents comprising an enclosure having a single opening therein adapted to admit entry of a rodent into the enclosure, generally U-shaped trapping means within said enclosure, comprising two opposed spring jaw members extending forwardly in the direction of said opening and terminating in opposed inwardly directed trapping portions, a holding member normally spanning the space between said jaw members at a locality rearwardly of said trapping portions and effective to hold said jaw members in spaced apart relation under tension, said holding member including material edible to rodents and adapted to be fractured by said rodent to release said jaw members and cause said members to force said trapping portions inwardly against said rodent by spring action.

No references cited.